R. BEANS.
Grass and Grain Harvester.
No. 13,504.
Patented Aug. 28, 1855.
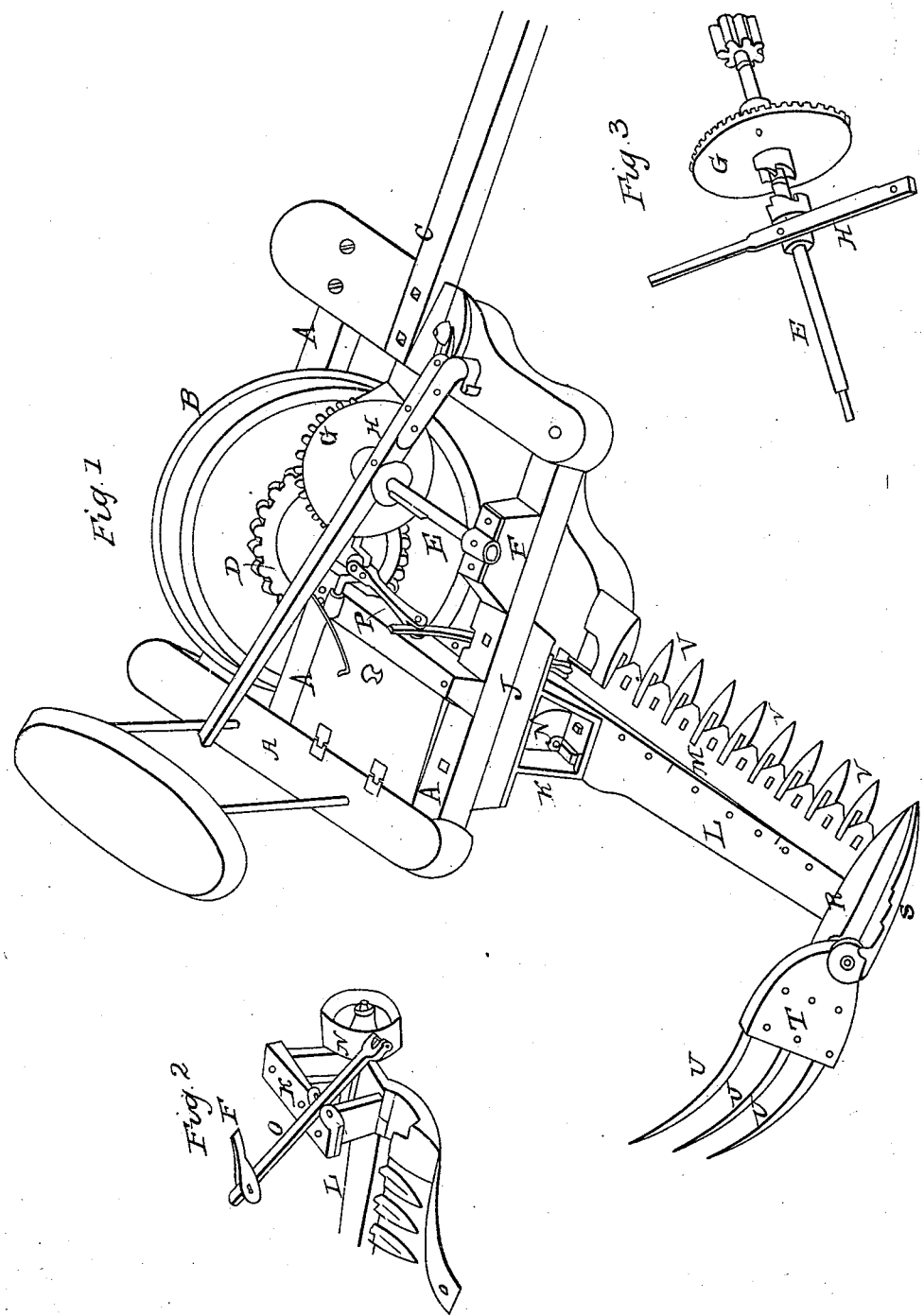

UNITED STATES PATENT OFFICE.

ROBERT BEANS, OF JOHNSVILLE, PENNSYLVANIA.

IMPROVEMENT IN MECHANISMS FOR CHANGING HARVESTERS FROM REAPERS TO MOWERS, AND VICE VERSA.

Specification forming part of Letters Patent No. 13,504, dated August 28, 1855.

*To all whom it may concern:*

Be it known that I, ROBERT BEANS, of Johnsville, in the county of Bucks and State of Pennsylvania, have invented a new and useful Improvement on a Grass and Grain Harvester; and I do hereby declare that the following is a full, clear, and exact description of the construction and operation of the same, reference being had to the accompanying drawings, making a part of this specification, in which—

Figure 1 is a perspective view, and Figs. 2 and 3 are sections of the same.

The frame A, to which the wheels and other parts of the machine are attached, is of a rectangular form, of sufficient length to receive the driving-wheel B between the end pieces, and of sufficient width to allow of two horses being attached to the tongue C, secured near the center of said frame, and enable them to walk clear of the standing grass or grain. The driving-wheel B rests upon the ground, and is put in motion by being drawn forward, imparts motion to the machinery by the friction upon the ground attendant upon its own weight. Said wheel is fastened upon a shaft, E, upon which is also secured a spur-cog wheel, D, said shaft being secured by boxes and bolts at one end to the outer side of frame, and the other end likewise secured to a corresponding piece placed parallel with it and a sufficient distance apart to admit the driving and spur-cog wheel D between them. Said cog-wheel D gears into a pinion which is fastened upon a shaft, E, said shaft, extending to the other outer side of frame and somewhat above it, resting on blocks F, secured by boxes and bolts. Upon this shaft and between said boxes is fitted a bevel-wheel, G, working against a collar, which collar is fitted to a corresponding recess in the hub of wheel G, keeping the wheel in place and allowing it to pass around freely on the shaft. On the same shaft and upon the other side of collar is a toothed clutch, corresponding with similar projections or teeth on the hub of wheel G. Said shaft has a key or feather fastened upon it, suited to a corresponding key-seat or groove cut in the clutch, so as to allow it to slide freely back and forth and at the same time compel it to turn around with the shaft. Around the periphery of the clutch is a turned groove, to which is fitted a loose collar, with shanks passing through a lever, H, said lever being secured at the end to the front piece of frame. A spring is also arranged to operate against the lever, which in turn moves the clutch, causing the teeth to unite with those on the hub of wheel, thus throwing it in gear by causing it to revolve with the shaft, and putting the crank and knives in motion. When it is desirable to throw out of gear the knives can be stopped immediately by pressing out the lever H and securing it by means of a hook and staple, thus disuniting the clutch and hub and allowing the shaft E to turn around on the bevel-wheel G freely, which can be done conveniently when the operator is either riding on the seat I or walking behind the machine, or whether the machine is in motion or otherwise. The teeth upon the clutch and hub are of such shape that by loosening the hook and upon a forward movement of the machine by the action of the spring it is in gear, and upon a backward movement it will pass out of gear without any movement on the part of the operator, thus relieving the horses of a portion of the draft in backing the machine. The bevel-wheel G gears into a pinion which is fastened upon a crank-shaft placed longitudinal with the frame and above it, so as to admit of the working of the crank.

To the outer side of frame and below it is a removable block, I, of any desirable thickness, to which is secured by bolts passing through the block and frame a perpendicular shoe, K, in the sole of which is formed a recess for the insertion of the cutter-bar L, and also another recess or opening for the cutting-knife M at the back part of shoe, and immediately above the cutter-bar is secured an axle for a traveling wheel, N, whose periphery extends below the cutter-bar, thus easing it off the ground and balancing the machine, and by substituting other wheels of any desirable size and removing the block above the shoe, or applying other blocks corresponding in thickness to the size of wheel used, so as to keep the cutter-bar in a horizontal position, the grass or grain can be cut at any desired height, and by simply removing the small wheel which is used in grass-cutting and applying the large one used in reaping without any change of block the machine can be moved from farm to farm or one field to another with the same facility as a wagon.

On the top part of shoe and facing the driving-wheel are formed two ears or projections, between which is secured by a pin or bolt an upright working-lever, O, the bottom of which is connected with the cutting-knife by a like pin or bolt. A connecting-rod, P, passes from the crank to the upper part of said lever, and by attaching it at a greater or less distance from the center will thus enable the operator to give the cutting-knife more or less sweep at pleasure, and at the same time attach it level, or nearly so, to the center of crank, thus avoiding the downward and upward pressure, and at each revolution of the crank, and consequent loss of power which must result from a direct attachment where the crank-shaft is above the level of the cutting-knife.

The cutter-bar is formed of wood or any suitable material and length, having fastened upon it at convenient distances apart teeth V, which have an opening to admit the knife-blades to pass through them. At the outer end of said bar a larger tooth or shoe is secured, of such shape as to part the standing and cut grass or grain. A parting-strip, R, is placed on top of the shoe in order to assist in parting tangled grass or grain. The track-scraper T is formed by inserting a movable block, by means of an opening or mortise, in the hind part of shoe S, in a right line with it, to which are attached curved fingers U, for the purpose of clearing the track of the cut grass and allowing the machine to cut the next swath without clogging.

The teeth V are formed with a slot for the knives to work in, having a square tenon, which is inserted in the cutter-bar, also an extension on the bottom, which terminates in a thin broad plate and secured thereto by rivets and screws, the former of which pass through the tenon and clinch on bottom of said plate. The plate answers the double purpose of bracing the tooth and preventing wear on cutter-bar.

The knife is composed of a series of angular blades fastened to a bar or back, which bar is inserted in an opening in upright levers O, and secured by a pin or bolt. It will thus be seen that the driving-wheel, through the cog-gearing, imparts motion to the crank, the crank through the connecting-rod to the upright lever, and the lever to the cutting-knife, giving it a reciprocating motion.

I claim—

The combination of the lever O and connecting-rod P with any means of altering the height of the frame above the cutter-bar for the purpose of retaining the same relations between the stroke of the knives and the teeth or fingers, although the distance between the head of the cutter-bar and the crank be varied in so doing, as set forth.

ROBERT BEANS.

Witnesses:
LEVI L. CROLL,
SAMUEL M. BANES.